(12) United States Patent
Pike et al.

(10) Patent No.: US 9,405,808 B2
(45) Date of Patent: *Aug. 2, 2016

(54) SYSTEM AND METHOD FOR ANALYZING DATA RECORDS

(75) Inventors: Robert C. Pike, Menlo Park, CA (US); Sean Quinlan, Menlo Park, CA (US); Sean M. Dorward, Martinsville, NJ (US); Jeffrey Dean, Palo Alto, CA (US); Sanjay Ghemawat, Moutain View, CA (US)

(73) Assignee: GOOGLE INC., Mountain View, CA (US)

( * ) Notice: Subject to any disclaimer, the term of this patent is extended or adjusted under 35 U.S.C. 154(b) by 418 days.

This patent is subject to a terminal disclaimer.

(21) Appl. No.: 13/407,632

(22) Filed: Feb. 28, 2012

(65) Prior Publication Data

US 2012/0215787 A1    Aug. 23, 2012

Related U.S. Application Data

(63) Continuation of application No. 12/533,955, filed on Jul. 31, 2009, now Pat. No. 8,126,909, which is a continuation of application No. 10/954,692, filed on Sep. 29, 2004, now Pat. No. 7,590,620, which is a continuation-in-part of application No. 10/871,244, filed on Jun. 18, 2004, now Pat. No. 7,650,331.

(51) Int. Cl.
  *G06F 17/30* (2006.01)
  *G06F 11/14* (2006.01)

(52) U.S. Cl.
  CPC ...... *G06F 17/30545* (2013.01); *G06F 11/1482* (2013.01); *Y10S 707/99933* (2013.01); *Y10S 707/99937* (2013.01)

(58) Field of Classification Search
  CPC ................................. G06F 17/30545
  See application file for complete search history.

(56) References Cited

U.S. PATENT DOCUMENTS

| 4,876,643 | A | 10/1989 | McNeill et al. |
| 5,345,584 | A | 9/1994 | Hill |
| 5,414,849 | A | 5/1995 | Yamamoto |
| 5,414,899 | A | 5/1995 | Raetz |
| 5,471,622 | A | 11/1995 | Eadline |
| 5,590,319 | A | 12/1996 | Cohen et al. |

(Continued)

OTHER PUBLICATIONS

Andreas C. Arpaci-Dusseau et al., "High-Performance Sorting on Networks of Workstations", Proceedings of the 1997 AMC SIGMOD International Conference on Management of Date, May 1997, Tuscon, Arizona.

(Continued)

*Primary Examiner* — James Trujillo
*Assistant Examiner* — Hubert Cheung
(74) *Attorney, Agent, or Firm* — Morgan, Lewis & Bockius LLP

(57) ABSTRACT

A method and system for analyzing data records includes allocating groups of records to respective processes of a first plurality of processes executing in parallel. In each respective process of the first plurality of processes, for each record in the group of records allocated to the respective process, a query is applied to the record so as to produce zero or more values. Zero or more emit operators are applied to each of the zero or more produced values so as to add corresponding information to an intermediate data structure. Information from a plurality of the intermediate data structures is aggregated to produce output data.

18 Claims, 9 Drawing Sheets

(56) References Cited

U.S. PATENT DOCUMENTS

| | | | |
|---|---|---|---|
| 5,659,547 A * | 8/1997 | Scarr et al. ..................... 714/4.4 |
| 5,806,059 A | 9/1998 | Tsuchida et al. |
| 5,819,251 A | 10/1998 | Kremer et al. |
| 5,870,743 A | 2/1999 | Cohen et al. |
| 5,884,299 A | 3/1999 | Ramesh et al. |
| 5,884,303 A | 3/1999 | Brown |
| 5,920,854 A | 7/1999 | Kirsch et al. |
| 5,956,704 A | 9/1999 | Gautam et al. |
| 5,963,954 A | 10/1999 | Burrows |
| 6,006,224 A | 12/1999 | McComb et al. |
| 6,026,394 A | 2/2000 | Tsuchida et al. |
| 6,182,061 B1 * | 1/2001 | Matsuzawa et al. .......... 707/737 |
| 6,226,635 B1 | 5/2001 | Katariyz |
| 6,256,621 B1 | 7/2001 | Tsuchida et al. |
| 6,301,574 B1 | 10/2001 | Thomas et al. |
| 6,324,535 B1 * | 11/2001 | Bair et al. ..................... 707/769 |
| 6,366,904 B1 | 4/2002 | BenHadda et al. |
| 6,408,292 B1 | 6/2002 | Bakalash et al. |
| 6,556,988 B2 | 4/2003 | Tsuchida et al. |
| 6,567,806 B1 | 5/2003 | Tsuchida et al. |
| 6,631,382 B1 * | 10/2003 | Kouchi et al. |
| 6,741,992 B1 | 5/2004 | McFadden |
| 6,795,820 B2 * | 9/2004 | Barnett |
| 6,889,254 B1 * | 5/2005 | Chandra ........... G06F 17/30545 707/E17.032 |
| 6,910,070 B1 | 6/2005 | Mishra et al. |
| 6,961,723 B2 | 11/2005 | Faybishenko et al. |
| 6,983,322 B1 | 1/2006 | Tripp et al. |
| 7,099,871 B2 | 8/2006 | Faybishenko et al. |
| 7,103,590 B1 | 9/2006 | Murthy et al. |
| 7,146,365 B2 | 12/2006 | Allen et al. |
| 7,225,444 B1 * | 5/2007 | Yung et al. .................... 718/106 |
| 7,430,549 B2 | 9/2008 | Zane et al. |
| 7,433,863 B2 | 10/2008 | Zane et al. |
| 8,117,226 B2 * | 2/2012 | Samji et al. ................... 707/769 |
| 2002/0120917 A1 | 8/2002 | Abrari et al. |
| 2002/0147708 A1 | 10/2002 | Thomas et al. |
| 2002/0198869 A1 * | 12/2002 | Barnett ............................ 707/3 |
| 2002/0198872 A1 | 12/2002 | MacNicol et al. |
| 2003/0033279 A1 | 2/2003 | Gibson et al. |
| 2003/0217033 A1 | 11/2003 | Sandler et al. |
| 2004/0034639 A1 | 2/2004 | McFadden |
| 2004/0111410 A1 | 6/2004 | Burgoon et al. |
| 2004/0148273 A1 | 7/2004 | Allen et al. |
| 2004/0220960 A1 | 11/2004 | Ojeil et al. |
| 2005/0027701 A1 | 2/2005 | Zane et al. |
| 2005/0028134 A1 | 2/2005 | Zane et al. |
| 2005/0049996 A1 | 3/2005 | Srinivasan et al. |
| 2005/0050030 A1 | 3/2005 | Gudbjartsson et al. |
| 2005/0091224 A1 * | 4/2005 | Fisher et al. .................. 707/100 |
| 2005/0097108 A1 | 5/2005 | Wang et al. |
| 2005/0131893 A1 | 6/2005 | Von Glan |
| 2005/0138222 A1 | 6/2005 | Chari et al. |
| 2005/0262045 A1 | 11/2005 | Tsuchida et al. |
| 2012/0221599 A1 * | 8/2012 | Seitz et al. ..................... 707/769 |

OTHER PUBLICATIONS

Baratloo, et al., "Charlotte: Metacomputing on the Web", Proceedings of the 9th International Conference on Parallel and Distributed Computing Systems, 1996.

Barroso, et al., "Web Search for a Planet: The Google Cluster Architecture", IEEE Micro, Mar.-Apr. 2003, pp. 22-28.

Blelloch, et al., "Scans as Primitive Parallel Operations", IEEE Transactions on Computers, C-38(11), Nov. 1989.

Ghemawat, et al., "The Google File System", 19th Symposium on Operating Systems Principles, Lake George, New York, 2003, pp. 29-43.

Gorlatch, "Systematic Efficient Parallelization of Scan and Other List Homomorphisms", Euro-Par '96, Parallel Processing, Lecture Notes in Computer Science, 1996, pp. 401-408.

Gray, "Year 2004 Results", Sort Benchmark Home Page, http://reasearch.microsoft.com/brac/SortBenchmark/.

Gropp, et al., Using MIP: Portable Parallel Programming with the Message_Passing Interface, MIT Press, Cambridge, MA 1999.

Ladner, et al., "Parallel Prefix Computation", Journal of the ACM, vol. 27, No. 4, Oct. 1980, pp. 831-838.

Riedel, et al., "Active Disks for Large-Scale Data Processing", IEEE Computer, Jun. 2001, pp. 68-74.

Thain, et al., "Distributed Computing in Practice: The Condor Experience", Concurrency and Computation: Practice and Experience, 204.

Wyllie, "SPsort: How to Sort a Terabyte Quickly", http:/alme.almaden.ibm.com/sc/spsort.pdf.

Baliant, A Bridging Model for Parallel Computation:, Communications of the ACM, vol. 33, No. 8, Aug. 1990, pp. 103-111.

"AT&T Labs Research-Hancock Project", http://www.research.att.cm/~kfisher/hancock/.

* cited by examiner

Task Status Table

| Task ID | Status | Process | Input Files | Output Files | ... |
|---|---|---|---|---|---|
| Map0000 | Completed | P0000 | 12340 | 12341 | ... |
| Map0001 | Completed | P0001 | 12344 | 12345 | ... |
| ⋮ | ⋮ | | | | |
| Map0103 | In Progress | P0010 | 12030 | 12031 | ... |
| Map0104 | Failed | P0011 | 10101 | 12102 | ... |
| Map0103b | In Progress | P0010 | 12030 | 12031 | ... |
| ⋮ | ⋮ | | | | |
| Red0000 | In Progress | P0033 | 12340, ... | 14000 | ... |
| Red0001 | Waiting | - | - | - | ... |

*Figure 7A*

Process Status Table

| Process ID | Status | Location | Current | ... |
|---|---|---|---|---|
| P0000 | Busy | CPU001 | Task Map0000 | ... |
| P0001 | Busy | CPU011 | Task Map0001 | ... |
| ⋮ | ⋮ | | | |
| P0033 | Busy | CPU015 | Task Red0000 | ... |
| P0034 | Idle | CPU016 | None | ... |
| P0034 | Failed | CPU016 | None | ... |
| ⋮ | ⋮ | | | |
| P0100 | Busy | CPU031 | WQMaster | ... |

*Figure 7B*

SYSTEM AND METHOD FOR ANALYZING DATA RECORDS

CROSS REFERENCE TO RELATED APPLICATION

This application is a continuation of U.S. patent application Ser. No. 12/533,955, filed Jul. 31, 2009, now U.S. Pat. No. 8,126,909, which is a continuation of U.S. patent application Ser. No. 10/954,692, filed Sep. 29, 2004, now U.S. Pat. No. 7,590,620, which is a continuation-in-part of U.S. application Ser. No. 10/871,244, filed Jun. 18, 2004, now U.S. Pat. No. 7,650,331, which are incorporated herein by reference in their entirety.

TECHNICAL FIELD

The disclosed embodiments relate generally to data processing systems and methods, and in particular to a framework for simplifying large-scale data processing and analyzing data records.

BACKGROUND

Large-scale data processing involves extracting data of interest from raw data in one or more datasets and processing it into a useful data product. The implementation of large-scale data processing in a parallel and distributed processing environment typically includes the distribution of data and computations among multiple disks and processors to make efficient use of aggregate storage space and computing power.

Various languages and systems provide application programmers with tools for querying and manipulating large datasets. These conventional languages and systems, however, fail to provide support for automatically parallelizing these operations across multiple processors in a distributed and parallel processing environment. Nor do these languages and systems automatically handle system faults (e.g., processor failures) and I/O scheduling. Nor do these languages and systems efficiently handle the analysis of data records.

SUMMARY

A method and system for analyzing data records includes allocating groups of records to respective processes of a first plurality of processes executing in parallel. In each respective process of the first plurality of processes, for each record in the group of records allocated to the respective process, a query is applied to the record so as to produce zero or more values. Zero or more emit operators are applied to each of the zero or more produced values so as to add corresponding information to an intermediate data structure. Information from a plurality of the intermediate data structures is aggregated to produce output data.

BRIEF DESCRIPTION OF THE DRAWINGS

FIG. 7A is a block diagram of an exemplary task status table.

FIG. 7B is a block diagram of an exemplary process status table.

Like reference numerals refer to corresponding parts throughout the several views of the drawings.

DESCRIPTION OF EMBODIMENTS

Large-Scale Data Processing Model

Figure 1:
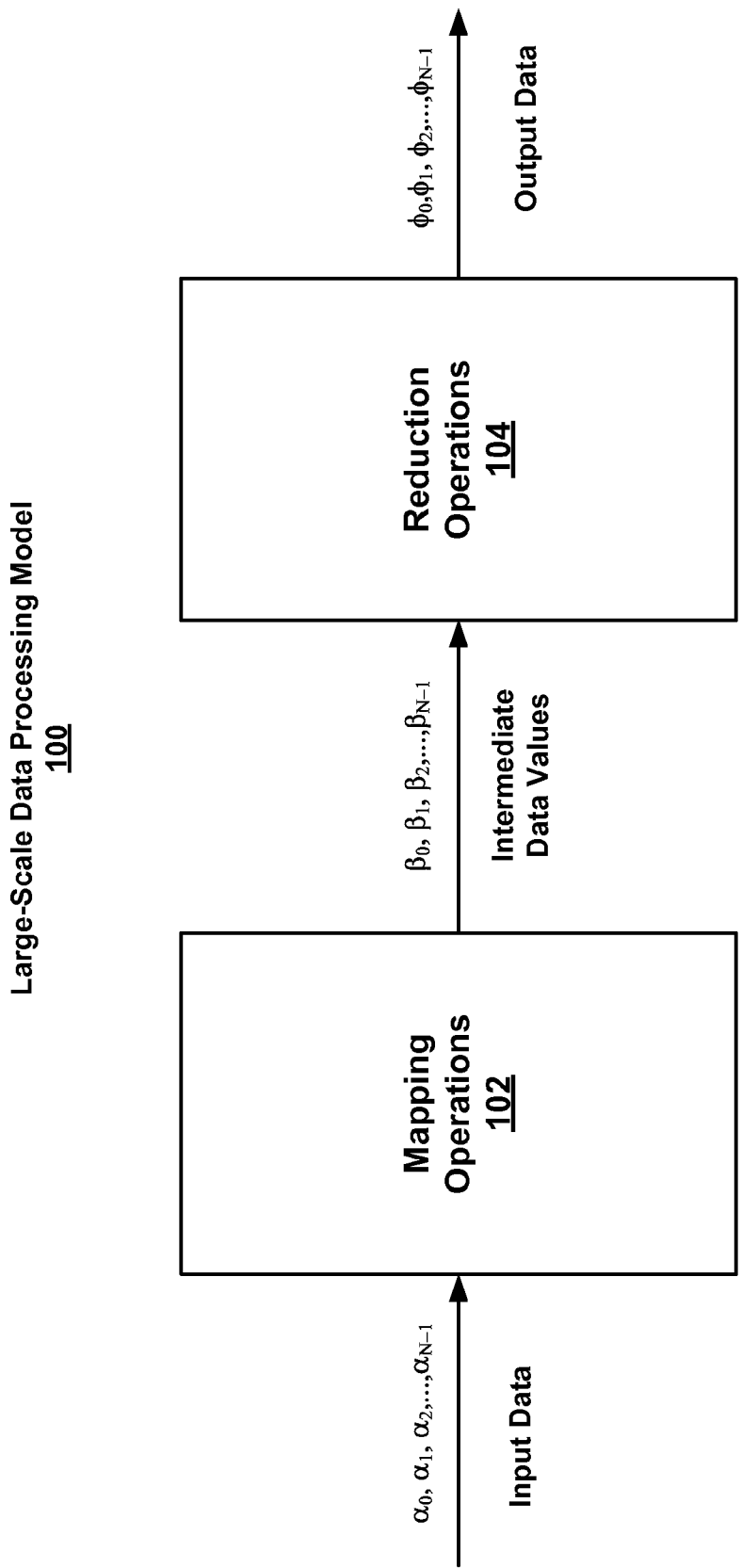
FIG. 1 is a block diagram of a large-scale data processing model.

FIG. 1 is a block diagram of a large-scale data processing model 100. The model 100 generally includes mapping operations 102 and reduction operations 104. The mapping operations 102 apply one or more mapping operations to a set of input data $\alpha_i$ (e.g., text files, records, logs, sorted maps, etc.) to provide a set of intermediate data values $\beta_i$. The reduction operations 104 apply one or more reduction operations to the set of intermediate data values $\beta_i$ to provide a set of output data $\phi_i$ (e.g., tables, sorted maps, record I/O, etc.). In some embodiments, the mapping operations 102 are implemented by one or more application-specific mapping functions, which map a set of input data $\alpha_i$ to a set of intermediate data values $\beta_i$. The intermediate data values $\beta_i$ or information corresponding to the intermediate data values are stored in one or more intermediate data structures. Some examples of intermediate data structures include, without limitation, files, buffers, histograms, count tables and any other suitable data structure or device for storing digital information. In some embodiments, the intermediate data values $\beta_i$ are processed by the reduction operations 104, which are implemented by one or more application-specific reduction functions, which reduce the set of intermediate data values $\beta_i$ to a set of output data $\phi i$. In some embodiments, the intermediate data values $\beta_i$ are processed by one or more application-independent statistical information processing functions, which reduce the set of intermediate data values $\beta_i$ to a set of output data $\phi i$.

Distributed Data Processing System

In order to explain the operation of the large scale data processing system, it is helpful to consider an exemplary distributed data processing system in which the large scale data processing is performed. In general, the embodiments described here can be performed by a set of interconnected processors that are interconnected by one or more communication networks.

Figure 5:
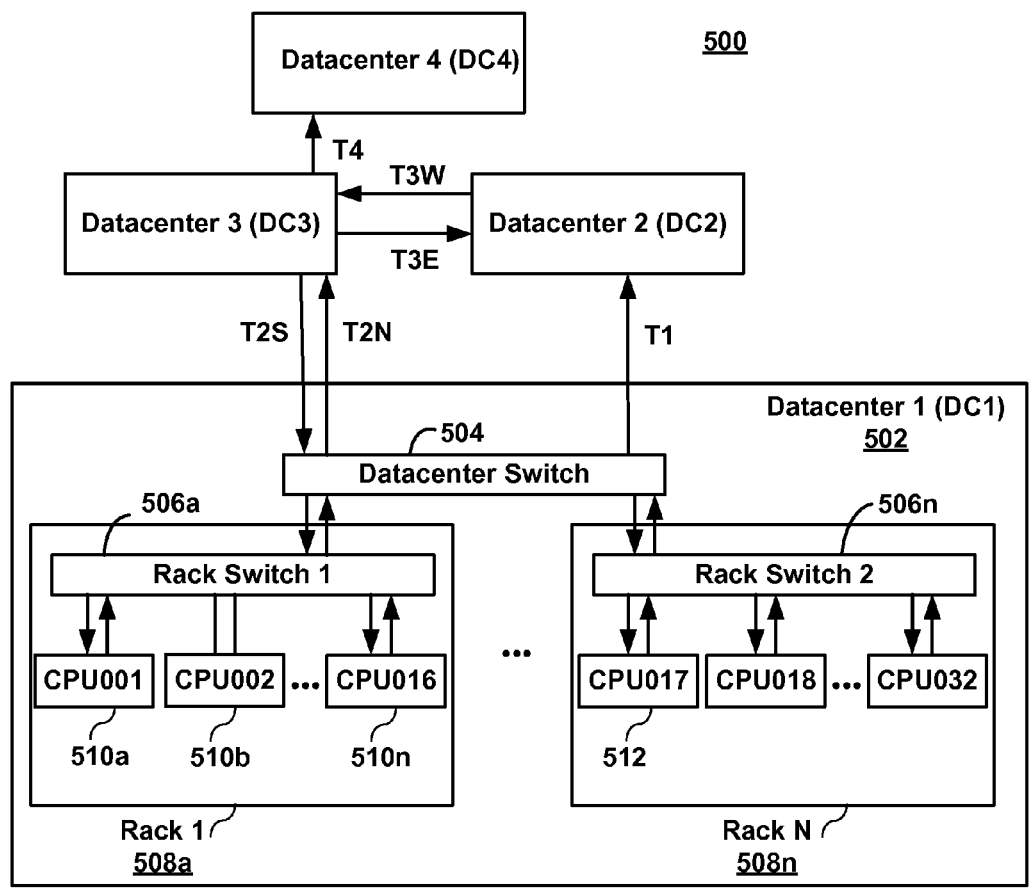
FIG. 5 is a block diagram of a data distribution network for large-scale data processing.

FIG. 5 is a block diagram of an exemplary distributed data processing system 500. It should be appreciated that the layout of the system 500 is merely exemplary and the system 500 may take on any other suitable layout or configuration. The system 500 is used to store data, perform computational tasks, and transmit data between datacenters DC1-DC4. The system may include any number of data centers DCx, and thus the number of data centers shown in FIG. 5 is only exemplary. The system 500 may include dedicated optical links or other dedicated communication channels, as well as supporting hardware such as modems, bridges, routers, switches, wireless antennas and towers, and the like. In some embodiments, the system 500 includes one or more wide area networks (WANs) as well as multiple local area networks (LANs). In some embodiments, the system 500 utilizes a private network, i.e., the system and its interconnections are designed and operated exclusively for a particular company or customer. Alternatively, a public network may be used.

Some of the datacenters DC1-DC4 may be located geographically close to each other, and others may be located far from the other datacenters. In some embodiments, each datacenter includes multiple racks. For example, datacenter 502 (DC1) includes multiple racks 508a, ..., 508n. The racks 508 can include frames or cabinets into which components are mounted. Each rack can include one or more processors (CPUs) 510. For example, the rack 508a includes CPUs 510a, ..., 510n (slaves 1-16) and the nth rack 506n includes multiple CPUs 510 (CPUs 17-32). The processors 510 can include data processors, network attached storage devices, and other computer controlled devices. In some embodiments, at least one of processors 510 operates as a master processor, and controls the scheduling and data distribution tasks performed throughout the system 500. In some embodiments, one or more processors 510 may take on one or more roles, such as a master and/or slave. A rack can include storage (e.g., one or more network attached disks) that is shared by the one or more processors 510.

In some embodiments, the processors 510 within each rack 508 are interconnected to one another through a rack switch 506. Furthermore, all racks 508 within each datacenter 502 are also interconnected via a datacenter switch 504. As noted above, the present invention can be implemented using other arrangements of multiple interconnected processors.

Further details regarding the distributed network 500 of FIG. 5 can be found in U.S. patent application Ser. No. 10/613,626, entitled "System and Method For Data Distribution," filed Jul. 3, 2003, which application is incorporated by reference herein in its entirety.

In another embodiment, the processors shown in FIG. 5 are replaced by a single large-scale multiprocessor. In this embodiment, map and reduce operations are automatically assigned to processes running on the processors of the large-scale multiprocessor.

Large-Scale Data Processing System I

Figure 2:
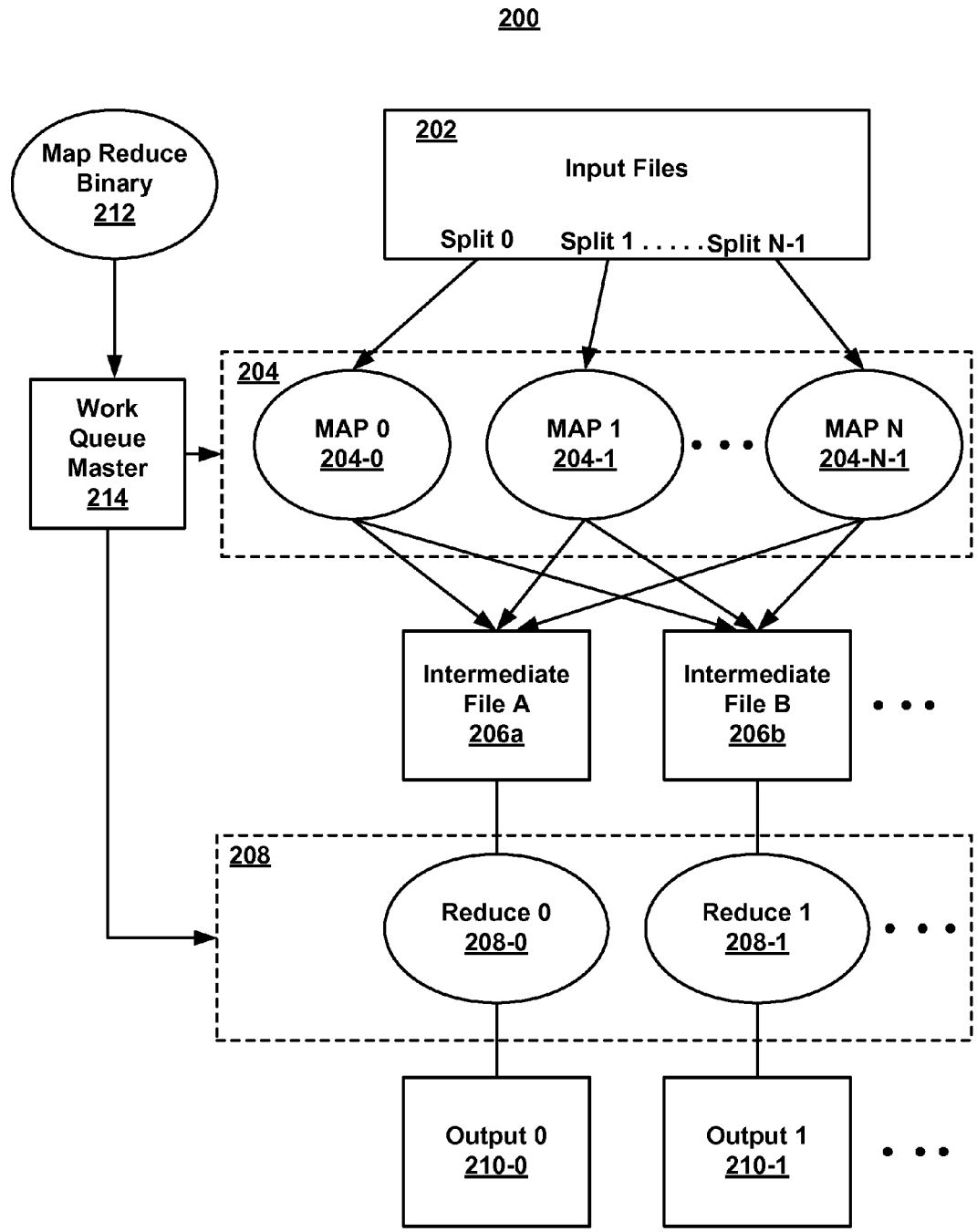
FIG. 2 is a block diagram of a large-scale data processing system.

FIG. 2 is a block diagram of a large-scale data processing system 200. The system 200 provides application programmers with an application-independent framework for writing data processing software that can run in parallel across multiple different machines on a distributed network. The system 200 is typically a distributed system having multiple processors, possibly including network attached storage nodes, that are interconnected by one or more communication networks. FIG. 2 provides a logical view of a system 200, which in some embodiments may be implemented on a system having the physical structure shown in FIG. 5. In one embodiment, the system 200 operates within a single data center of the system 500 shown in FIG. 5, while in another embodiment, the system 200 operates over two or more data centers of the system 500.

As shown in FIG. 2, a set of input files 202 are processed by a first set of processes 204, herein called map processes, to produce a set of intermediate data, represented here by files 206. The intermediate data 206 is processed by a second set of processes 208, herein called reduce processes, to produce output data 210. Generally each "map process" is a process configured (or configurable) to perform map functions and to execute an application-specific map operator. Each "reduce process" is a process configured (or configurable) to perform reduce functions and to execute an application-specific reduce operator. In some embodiments, the application-specific reduce operator includes or is replaced by one or more application-independent statistical information processing functions. A control or supervisory process, herein called the work queue master 214, controls the set of processing tasks. As described in more detail below, the work queue master 214 determines how many map tasks to use, how many reduce tasks to use, which processes and processors to use to perform those tasks, where to store the intermediate data and output data, how to respond to any processing failures, and so on.

It should be noted that the work queue master 214 assigns tasks to processes, and that multiple processes may be executed by each of the processors in the group of processors that are available to do the work assigned by the work queue master 214. In the context of FIG. 5 or any other multiple processor system, the set of processes controlled by the work queue master 214 may be a subset of the full set of processes executed by the system, and furthermore the set of processors available to do the work assigned by the work queue master 214 may be fewer than the full set of processors in the system. Some of the resources of the system may be used for other tasks, such as tasks that generate the input data 202, or that utilize the output data 210. However, in some embodiments, some or all of the tasks that generate the input data 202 or utilize the output data 210 may also be controlled or supervised by the work queue master 214. In addition, in some embodiments processors can be added or removed from the processing system during the execution of a map-reduce operation. The work queue master 214 keeps track of the processors in the system and the available processes executing on those processors.

Application programmers are provided with a restricted set of application-independent operators for reading input data and generating output data. The operators invoke library functions that automatically handle data partitioning, parallelization of computations, fault tolerance (e.g., recovering from process and machine failures) and I/O scheduling. In some embodiments, to perform a specific data processing operation on a set of input files, the only information that must be provided by an application programmer is: information identifying the input file(s), information identifying or specifying the output files to receive output data, and two application-specific data processing operators, hereinafter referred to as map( ) and reduce( ) Generally, the map( ) operator specifies how input data is to be processed to produce intermediate data and the reduce( ) operator specifies how the intermediate data values are to be merged or otherwise combined. Note that the disclosed embodiments are not limited to any particular type or number of operators. Other types of operators (e.g., data filters) can be provided, as needed, depending upon the system 200 architecture and the data processing operations required to produce the desired, application-specific results. In some embodiments, the application programmers provide a partition operator, in addition to the map( ) and reduce( ) operators. The partition( ) operator, specifies how the intermediate data is to be partitioned over a set of intermediate files.

To perform large-scale data processing, a set of input files 202 are split into multiple data blocks 0, ..., N−1 of either a specified or predefined size (e.g., 64 MB). Alternately, in some embodiments the input files 202 have a predefined maximum size (e.g., 1 GB), and the individual files are the data blocks. A data block is a subset of data that is retrieved during processing. In some embodiments, the data blocks are distributed across multiple storage devices (e.g., magnetic or optical disks) in a data distribution network to fully utilize the aggregate storage space and disk bandwidth of the data processing system.

Referring to FIGS. 2 and 5, in some embodiments the input data files 202 are stored in one or more data centers DC1-DC4. Ideally, the work queue master 214 assigns tasks to processors 510 in datacenters where the input files are stored so as to minimize network traffic whenever possible. In some embodiments, the work queue master 214 uses input file information received from a file system to determine the appropriate processor or process for executing a task, using a hierarchical decision process. When a process in a processor in a datacenter DC1-DC4 is idle, it requests a task from the work queue master 214. The work queue master 214 searches the input file information received from the file system (e.g., FS 446, FIG. 4), for an unprocessed data block on the machine assigned to process the task. If none are available, the work queue master 214 searches the file information for an unprocessed data block on the same rack 508 as the machine assigned to process the task. If none are available, the work queue master 214 searches the file information for an unprocessed data block in the same datacenter as the machine assigned to process the task. If none are available, the work queue master 214 will search for unprocessed blocks in other datacenters.

By using a hierarchical assignment scheme, data blocks can be processed quickly without requiring large volumes of data transfer traffic on the system 500. This in turn allows more tasks to be performed without straining the limits of the system 500.

Task Management

Referring again to FIG. 2, application programmers develop the map( ) and/or reduce( ) operators, which are computer programs that process input data and intermediate, respectively. In some embodiments these operators are compiled into binary files 212 suitable for use on a particular processing platform. The binary files 202 are loaded into a work queue master module 214, which manages jobs submitted by users of the system 200. In some embodiments, the work queue master 214 loads (or causes to be loaded) onto each process to which it allocates a map or reduce task, the library procedures, and the map( ) or reduce( ) operator required to perform the task assigned to the process.

The work queue master 214, when it receives a request to process a set of data using a specified set application-specific map( ) reduce( ) and, optionally, partition( ) operators, determines the number of map tasks and reduce tasks to be performed to process the input data. This may be based on the amount of input data to be processed. For example, a job may include 10,000 map tasks and 10 reduce tasks. In some embodiments, the work queue master module generates a task status table having entries representing all the tasks to be performed, and then begins assigning those tasks to idle processes. As noted above, tasks may be allocated to idle processes based on a resource allocation scheme (e.g., priority, round-robin, weighted round-robin, etc.).

Process and Task Status Tracking

Figure 6:
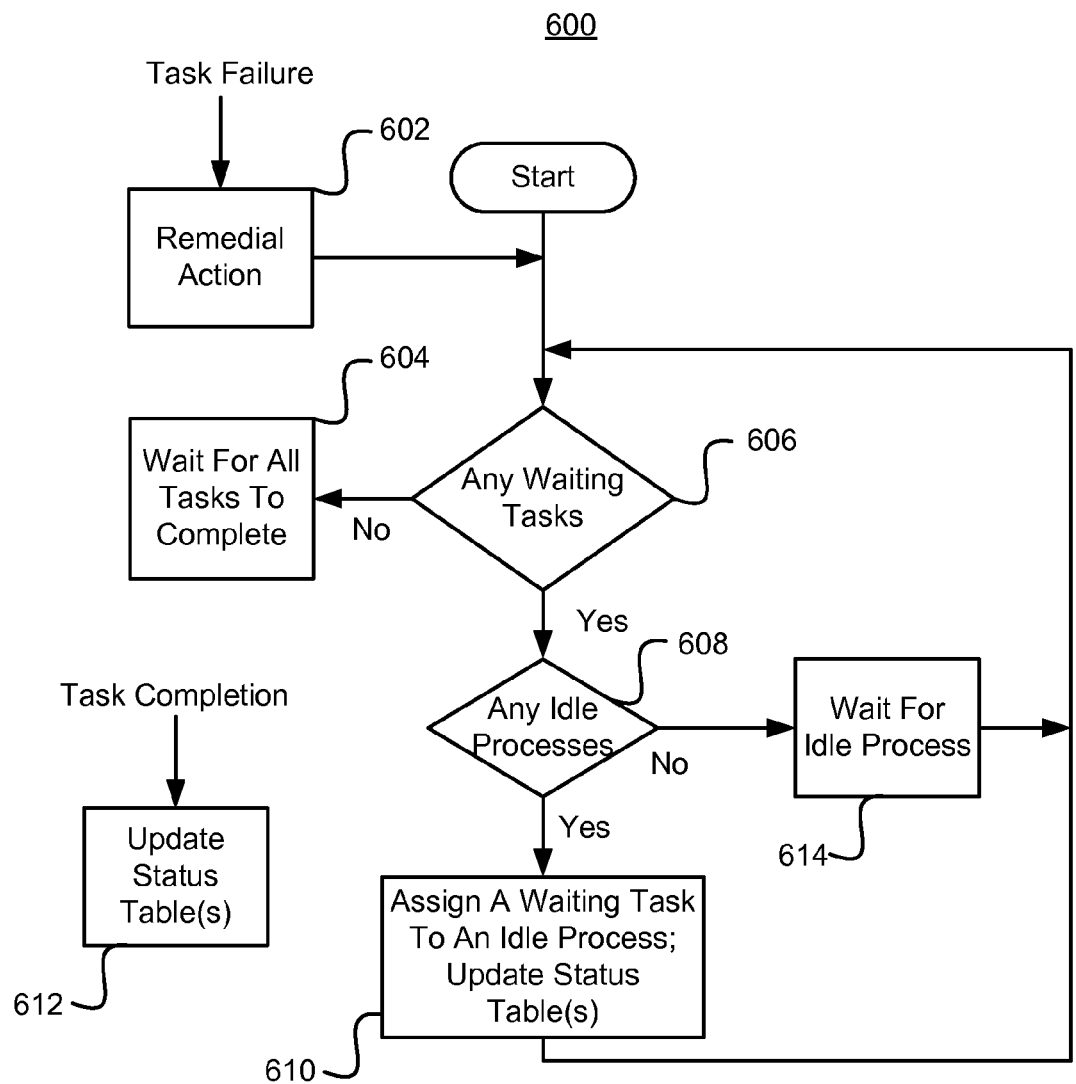
FIG. 6 is a flow diagram of an embodiment of a process for assigning tasks to processes.

FIG. 6 is a flow diagram of an embodiment of a process 600 for assigning tasks to processes. Process 600 parallelizes a data processing task over as many processes as is consistent with the available computing resources. While the process 600 described below includes a number of steps that appear to occur in a specific order, it should be apparent that the process 600 steps are not limited to any particular order, and, moreover, the process 600 can include more or fewer steps, which can be executed serially or in parallel (e.g., using parallel processors or a multi-threading environment). Further, it should be noted that the steps or acts in process 600 are application-independent and are implemented using modules or instructions that are application-independent. Only the actual map and reduce operators, which produce intermediate data values from the input data and that produce output data from the intermediate data values, respectively, are application-specific. These application-specific operators are invoked by the map and reduce tasks assigned to processes in step 610. By making a clear boundary between the application-independent aspects and application-specific aspects of performing a large scale data processing operation, the application-independent aspects can be optimized, thereby making the entire large scale data processing operation very efficient. As noted above, in some embodiments, the application-specific reduce operator is replaced by one or more application-independent statistical information processing functions.

The process 600 begins by determining if there are tasks waiting to be assigned to a process (step 606). If there are no tasks waiting, then the process 600 waits for all the tasks to complete (step 604). If there are tasks waiting, then the process 600 determines if there are any idle processes (step 608). If there are idle processes, then the process 600 assigns a waiting task to an idle process (step 610) and returns to step 606. If there are no idle processes, the process 600 waits for an idle process (step 614). Whenever a process completes a task, the process sends a corresponding message to the work queue master 214, which updates the process and task status tables (step 612). The work queue master 214 may then assign a new task to the idle process, if it has any unassigned tasks waiting for processing resources. For reduce tasks, the work queue master 214 may defer assigning any particular reduce task to an idle process until such time that the intermediate data to be processed by the reduce task has, in fact, been generated by the map tasks. Some reduce tasks may be started long before the last of the map tasks are started if the intermediate data to be processed by those reduce tasks is ready for reduce processing.

In some embodiments, whenever a process fails, which may be discovered by the work queue master 214 using any of a number of known techniques, the work queue master 214 (A) determines what task was running in the failed process, if any, (B) assigns that task to a new process, waiting if necessary until an idle process becomes available, and (C) updates its process and task status tables accordingly. In some embodiments, the work queue master 214 may undertake remedial measures (step 602), such as causing the failed process to be restarted or replaced by a new process. In some embodiments, the work queue master may further detect when such remedial measures fail and then update its process status table to indicate such failures. In addition, in some embodiments, when a map task fails and is restarted in a new process, all processes executing reduce tasks are notified of the re-execution so that any reduce task that has not already read the data produced by the failed process will read the data produced by the new process.

FIG. 7A shows an exemplary task status table for keeping track of the status of map and reduce tasks. In some embodiments, each task (e.g., map, reduce) is assigned task ID, a status, a process, and one or more input files and output files. In some embodiments, the input files field may specify a portion of an input file (e.g., where the portion comprises a data block) to be processed by the task, or this field may specify portions of two of more input files. The status field indicates the current status of the task (e.g., waiting, in-progress, completed, or failed), which is being performed by the assigned process identified in the process field. The process retrieves data from one or more input files (or the one or more input file portions) identified in the input file field and writes the results of the task ID to one or more output files identified in the output file field. For example, in FIG. 7A, task Red0000 is assigned to process P0033, which is still in progress. The process P0033 retrieves data blocks from input file 12340 (e.g., intermediate file A, FIG. 2) and writes the results of the task to output file 14000. In some embodiments, until a task is assigned to a process, the process field in the task status table indicates that no process has yet been assigned to perform that task. It should be apparent that there could be more or fewer fields in the task status table than shown in FIG. 7A, such as multiple fields for identifying output and input files.

FIG. 7B shows a process status table for keeping track of the status of all the processes to which the work queue master 214 can assign tasks. In some embodiments, each process is assigned to a task and a location. In some embodiments, each process is permanently assigned to a particular location (i.e., a particular processor). The status field indicates the current status of the process, which performs the assigned task at the assigned location. For example, process P0001 is "Busy" performing task Map0001 on location CPU011. It should be apparent that there could be more or fewer fields in the process status table than shown in FIG. 7B, such as assigning multiple locations assigned to a single task (e.g., parallel processing).

Map Phase

In some embodiments, the set of application-specific data processing operations that the map( ) operator can perform is constrained. For example, in some embodiments, the map( ) operator may be required to process the input data one record at a time, proceeding monotonically from the first record to the last record in the data block being processed. In some embodiments, the map( ) operator may be required to generate its output data in the form of key/value pairs. Either the key or value or both can comprise structured data, as long as the data can be encoded into a string. For example, the key may have multiple parts, or the value may have multiple parts.

By requiring the map( ) operator's output to be in the form of key/value pairs, the resulting intermediate data can be mapped to a set of intermediate data files in accordance with a partition( ) operator. An exemplary partition( ) operator may specify that all intermediate data is to be directed to an intermediate file corresponding to the value of the first byte of the key. Another exemplary partition( ) operator may specify that all intermediate data is to be directed to an intermediate file corresponding to the value of the function "hash(Key) modulo N", where N is a value specified by the application programmer and "hash(Key)" represents the value produced by applying a hash function to the key of the key/value pairs in the intermediate data. In some embodiments, the partition operator is always a modulo function and the application programmer only specifies the modulus to be used by the modulo function. In one embodiment, the partition operator is automatically selected by the work queue master 214, or by one of the application-independent library functions, discussed below.

In some embodiments, the data blocks 0, . . . , N−1 are automatically assigned to map tasks (executed by map processes 204-0, . . . , 204-N−1) in an application independent manner, by the work queue master 214. In particular, the work queue master 214 is configured to determine the number of data blocks to be processed, and to create a corresponding number of instances of the map process 204. Stated in another way, the work queue master 214 assigns a corresponding number of map tasks to processes, as suitable processes become available. Since the number of map tasks may exceed the number of processes available to the work queue master 214, the work queue master 214 will assign as many map tasks as it can to available processes, and will continue to assign the remaining map tasks to processes as the processes complete previously assigned tasks and become available to take on new tasks. The work queue master 214 uses the task status table and process status tables, described above, to coordinate its efforts.

Reduce Phase

Reduce modules 208 read intermediate data values (e.g., key/value pairs) from the intermediate files 206. In some embodiments, each reduce module 208 reads from only one intermediate file 206. The reduce modules 208 sort the intermediate data values, merge or otherwise combine sorted intermediate data values having the same key and then write the key and combined values to one or more output files 210. In some embodiments, the intermediate file 206 and the output files 210 are stored in a File System (FS), which is accessible to other systems via a distributed network. In some embodiments described below, the reduce phase executes one or more application-specific reduce operators to perform the data merging or combining operation. In an embodiment described below, the data merging or combining operation is performed by one or more application-independent reduce operators, but the selection of which reduce operator(s) to use for any particular data processing operation is application specific.

Software Implementation

In some embodiments, the map and reduce modules 204 and 208 are implemented as user-defined objects with methods to carry out application-specific processing on data using known object oriented programming techniques. For example, a MapReduction base class can be created that includes methods and data for counting the number of input files that contain a particular term or pattern of terms, sorting the results of the sort, eliminating duplicates in the sorted results and counting the number of occurrences of the term. Application programmers can derive other classes from the base class and instantiate the base class as an object in the application code to access its data and methods.

Large-Scale Data Processing System II

While the system 200 provides good performance for many large-scale data processing, the performance of the system 200 may diminish as the amount of data to be processed and thus the number of tasks increases. For instance, performance may be diminished when the size of the data blocks is decreased, thereby increasing the number of map tasks. Since the intermediate files 206 are stored in the FS, an increase in tasks results in an increase in intermediate file access requests and an associated increase in network traffic. Additionally, a single work queue master 214 can only handle a limited number of task assignments per time period, beyond which the work queue master 214 begins to limit system performance. Increasing the size of those tasks to accommodate additional jobs could result in load imbalances in the system 200. These performance issues are addressed in the system 300, which is described below with respect to FIG. 3.

Figure 3:
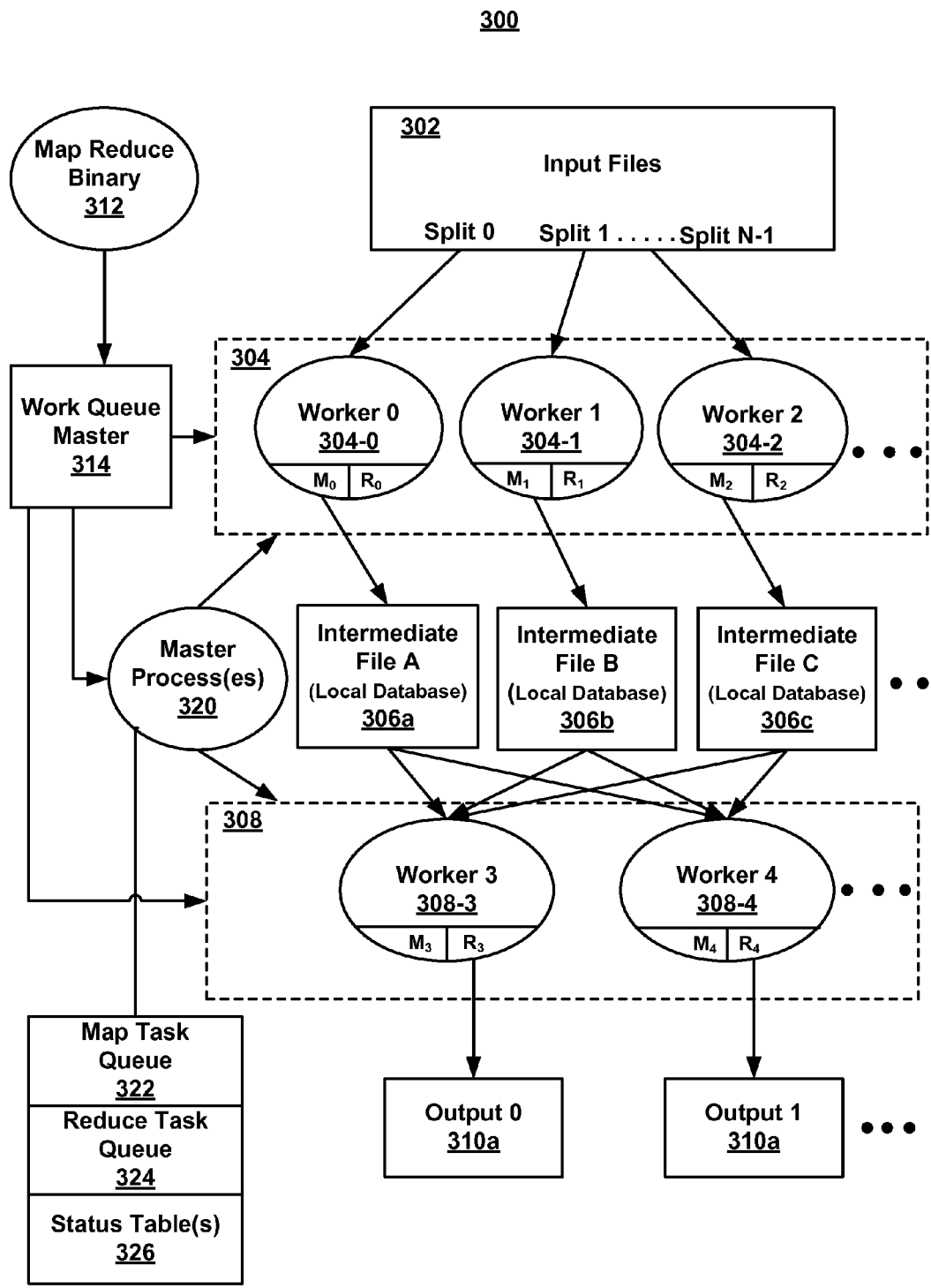
FIG. 3 is a block diagram of a large-scale data processing system, including a master process for managing tasks.

FIG. 3 is a block diagram of a large-scale data processing system 300, including a master process 320 (sometimes called a supervisory process) for managing tasks. In system 300, one or more master processes 320 assign one or more tasks to one or more worker processes 304 and 308. In some embodiments, the master process 320 is a task itself (e.g., task 0) initiated by the work queue master module 314 and is responsible for assigning all other tasks (e.g., mapping and reducing tasks) to the worker processes 304, 308, in a master/slave type relationship. The worker processes 304, 308 include two or more process threads, each of which can be invoked based on the particular task assigned to it by the master process 320. For example, each worker process 304 invokes a map thread to handle an assigned map task and invokes a reduce thread to handle an assigned reduce task. In one embodiment, the worker processes 304, 308 include one or more additional threads. For example, a distinct thread may be used to receive remote procedure calls (e.g., from the master process) and to coordinate work done by the other threads. In another example, a distinct thread may be used to handle remote read requests received from other processors (i.e., peers) in the system.

In one embodiment, the number of worker processes is equal to the number of machines available in the system 300 (i.e., one worker process per machine). In another embodiment, two or more worker processes are used in each of the machines in the system 300. If a worker process fails, its task is reassigned to another worker process by the master process 320. In some embodiments, the master process 320 or the work queue master 314 may undertake remedial measures to repair, restart or replace a failed worker process.

In some embodiments, when the work queue master 314 receives a map/reduce data processing job, the work queue master 314 allocates the job to a master process 320. The master process 320 determines the number (M) of map tasks and the number (R) of reduce tasks to be performed, and then makes a request to the work queue master 314 for M+R processes (M+R+1, including the master process 320) to be allocated to the map/reduce data processing job. The work queue master 314 responds by assigning a number of processes to the job, and sends that information to the master process 320, which will then manage the performance of the data processing job. If the number of processes requested exceeds the number of processes available, or otherwise exceeds the number of processes that the work queue master 314 is allowed to assign to the job, the number of processes assigned to the job will be less than the number requested.

In some embodiments, all R of the reduce tasks are all immediately assigned to processes, but the reduce tasks do not begin work (e.g., on data sorting) until the master process 320 informs them that there are intermediate files ready for processing. In some embodiments, a single worker process 304/308 can be assigned both a map task and a reduce task, simultaneously (with each being executed by a distinct process thread), and therefore assigning reduce tasks to processes at the beginning of the job does not reduce the throughput of the system.

Map Phase

The division of input files 302 into data blocks 0, . . . , N−1, may be handled automatically by the application independent code. Alternately, the user may set an optional flag, or specify a parameter, so as to control the size of the data blocks into which the input files are divided. Furthermore, the input data may come from sources other than files, such as a database or in-memory data structures.

The input data blocks 0, . . . , N−1, which may in some embodiments be treated as key/value pairs, are read by application independent worker processes 304-0, . . . , 304-N−1, as shown in FIG. 3. The input files 302 can include a variety of data types typically used in data processing systems, including without limitation text files, record I/O, sorted data structures (such as B-trees), tables and the like. Each of the worker processes 304 to which a map task has been assigned applies the application-specific map( ) operator to the respective input data block so as generate intermediate data values. The intermediate data values are collected and written to one or more intermediate files 306, which are stored locally at the machine (e.g., in one or more local databases) in which the worker process 304 is executed. The intermediate files 306 are retained (i.e., they are persistent) until the reduce phase completes. Note that in some embodiments, each of the intermediate files 306 receives output from only one worker process 304, as shown in FIG. 3. When a worker process 304 completes its assigned task, it informs the master process 320 of the task status (e.g., complete or error). If the task was successfully completed, the worker process's status report is treated by the master process 320 as a request for another task.

In some embodiments, if there are enough worker processes 304 that all the intermediate values can be held in memory across the worker processes, then the system need not write any data to files on local disks. This optimization reduces execution time for map-reduce operations in which the number of worker processes is sufficient to handle all the map tasks at once, and the amount of intermediate data is sufficiently small to be kept in memory.

Application-Specific Combiner Function

In some cases, there is significant repetition in the intermediate keys produced by each map task, and the application-specific Reduce function is both commutative and associative. When all these conditions apply, a special optimization can be used to significantly reduce execution time of the map-reduce task. An example of a situation in which the optimization can be applied is a map-reduce operation for counting the number of occurrences of each distinct word in a large collection of documents. In this example, the application-specific map function (sometimes called the map( ) operator elsewhere in this document) outputs a key/value pair for every word w in every document in the collection, where the key/value pair is <w, 1>. The application-specific reduce function (sometimes called the reduce( ) operator elsewhere in this document) for this example is:

```
input data is "values";
int result=0; // initialize result to zero
for each v in values:
        result += ParseInt(v);
output: <key, result>
```

Each map task in this example will produce hundreds or thousands of records of the form <word, 1>. The Reduce function simply adds up the count values. To help conserve network bandwidth for map-reduce operations that satisfy these properties, the user may provide an application-specific Combiner function or operator. The Combiner function is invoked with each unique intermediate key and a partial set of intermediate values for the key. This is similar to the Reduce function, except that it gets executed at the end of each Map task by the same machine and process that performed by Map task. The Combiner function partially summarizes the intermediate key/value pairs. In fact, when using a Combiner function, the same function is typically specified for the Combiner and Reduce operations. The partial combining performed by the Combiner operation significantly speeds up certain classes of Map-Reduce operations, in part by significantly reducing the amount of information that must be conveyed from the processors that handle Map tasks to processors handling Reduce tasks, and in part by reducing the complexity and computation time required by the data sorting and Reduce function performed by the Reduce tasks.

Reduce Phase

Application independent worker processes 308 which have been assigned reduce tasks read data from the locally stored intermediate files 306. In some embodiments, the master process 320 informs the worker processes 308 where to find intermediate data files 306 and schedules read requests for retrieving intermediate data values from the intermediate data files 306. In some embodiments, each of the worker processes 308 reads a corresponding one of the intermediate files 306 produced by all or a subset of the worker processes 304. For example, consider a system in which each of the worker processes 304 assigned a map task outputs M (e.g., 100) intermediate files, which we will call Partion-1,j through Partition-M,j, where j is an index identifying the map task that produced the intermediate files. The system will have 100 worker processes 308, Worker-1 to Worker-M, each of which reads a corresponding subset of the intermediate files, Partition-p,j for all valid values of "j," produced by the worker processes 304, where "p" indicates the partition assigned to a particular worker process Worker-P (304) and "j" is an index identifying the map tasks that produced the intermediate files.

Each worker process 308 sorts the intermediate data values in the subset of the intermediate files read by that worker process in accordance with the key of the key/value pairs in the intermediate data. The sorting of the key/value pairs is an application independent function of the reduce threads in the worker processes 308. Each worker process 308 also merges or otherwise combines the sorted intermediate data values having the same key, and writes the key and combined values to one or more output files 310. The merging or other combining operation performed on the sorted intermediate data is performed by an application-specific reduce( ) operator. In some embodiments, the application-specific reduce( ) operator is implemented using one or more application-independent statistical information processing functions. The selection of which application-independent statistical information processing functions to use, and the data to which these functions are to be applied, however, is application-specific, and in fact depends on which statistical information processing functions are used by the application-specific map operator. In some embodiments, the output files 310 are stored in a File System, which is accessible to other systems via a distributed network. When a worker process 308 completes its assigned reduce task, it informs the master process 320 of the task status (e.g., complete or error). If the reduce task was completed successfully, the worker process's status report is treated by the master process 320 as a request for another task. If the reduce task failed, the master process 320 reassigns the reduce task to another worker process 308.

Recovering from Task and Processor Failures

In some embodiments, the master process 320 is configured to detect task and processor failures. When a task failure is detected, the master process 320 reassigns the task to another process. In some embodiments, the master process 320 redistributes the work of the failed task over a larger number of tasks so as to complete that task more quickly than by simply re-executing the task on another process. The master process subdivides the work assigned to the failed task to a plurality of newly mini-tasks, and then resumes normal operation by assigning the mini-tasks to available processes. The number of mini-tasks may be a predefined number, such as a number between 8 and 32, or it may be dynamically determined based on the number of idle processes available to the master process. In the case of a failed map task, division of the work assigned to the failed task means assigning smaller data blocks to the mini-tasks. In the case of a failed reduce task, division of the work assigned to the failed task may mean assigning the data sorting portion of the reduce task to a larger number of worker processes, thereby performing a distributed sort and merge. The resulting sorted data may, in some embodiments, be divided into a number of files or portions, each of which is then processed using the reduce( ) operator to produce output data. By detecting such failures and taking these remedial actions, the amount of delay in completing the entire data processing operation is significantly reduced.

When a processor failure is detected by the master process 320, it may be necessary to re-execute all the tasks that the failed processor completed as well as any tasks that were in process when the processor failed, because the intermediate results produced by map tasks are stored locally, and the failure of the processor will in many cases make those results unavailable. Using the status tables, described above, the master process 320 determines all the tasks that ran on the processor, and also determines which of those tasks need to be re-executed (e.g., because the results of the tasks are unavailable and are still needed). The master process 320 then updates its status tables to indicate that these identified tasks are waiting for assignment to worker tasks. Thereafter, re-execution of the identified tasks is automatically handled using the processes and mechanisms described elsewhere in this document.

In some embodiments, an additional mechanism, herein called backup tasks, is used to guard against task failures as well as task slow downs. One of the main problems that lengthens the total time taken for a map-reduce operation to complete is the occurrence of "straggler" tasks or machines. A straggler is a process or machine that takes an unusually long time to complete one of the last few map or reduce tasks in the computation. Stragglers can arise for many reasons, including both hardware and software errors or conditions. When a large map-reduce operation is divided into thousands of map and reduce tasks executed by thousands of processes, the risk of a straggler task occurring is significant. The use of backup tasks, as described next, effectively guards against stragglers, without regard to the cause of the problem causing a process or machine to run slowly. In these embodiments, the master process determines when the map-reduce operation is close to completion. In one embodiment, the criteria for being close to completion is that the percentage of map tasks that have completed is above a threshold. In another embodiment, the criteria for being close to completion is that the percentage of map and reduce tasks, taken together, that have completed is above a threshold. The threshold can be any reasonably number, such as 95, 98, or 99 percent, or any percentage above 90 percent. Once the master process determines that the map-reduce operation is close to completion, the master process schedules backup executions of all remaining tasks. These duplicate tasks may be called backup map tasks and backup reduce tasks. FIG. 7A shows an exemplary backup task, Map103b, in the task status table. Each task is marked as completed when either the primary or backup execution completes. This mechanism obviously increases the computational resources, and thus in some embodiments the criteria for invoking this mechanism are selected so as to increase the computational resources by no more than a few percent (e.g., five percent). The use of backup tasks significantly reduces the time to complete large map-reduce operations, often by more than twenty-five percent.

Master Process & Status Tables

The master process 320 is responsible for assigning tasks to the worker processes 304 and 308 and for tracking their status and output. Periodically, the master process 320 solicits a report from each worker process assigned a task to determine its task status. In some embodiments, the report can be solicited using a polling scheme (e.g., round-robin). If the task status indicates that the worker process has failed, then the task is put back in the appropriate task queue to be reassigned to another worker process. In some embodiments, the master process 320 maintains status tables 326 for managing tasks, as described with respect to FIGS. 7A and 7B.

In one embodiment in which more than one master process 320 is used, a locking mechanism is used to ensure that each of the entries of the status tables is modified by only one of the master processes at any one time. Whenever a master process 320 attempts to assign a map or reduce task to a process, or perform any other management of a map or reduce task, the master process first acquires (or attempts to acquire) a lock on the corresponding status table entry. If the lock is refused, the master process concludes that the map/reduce task is being managed by another master process and therefore the master process looks for another map/reduce task to manage. In another embodiment, the task status table is divided into portions, with each master process being given ownership of a corresponding portion of the task status table, and responsibility for managing the map/reduce tasks in that portion of the task status table. Each master process can read other portions of the task status table, but only uses information in entries indicating that the corresponding task has been completed.

The system 300 provides several advantages over other systems and methods by using one or more master processes to assign and manage tasks, together with local databases to store intermediate results produced by the tasks. For example, by distributing file reads over multiple local databases more machines can be used to complete tasks faster. Moreover, since smaller tasks are spread across many machines, a machine failure will result in less lost work and a reduction in the latency introduced by such failure. For example, the FS load for system 200 is O(M*R) file opens and the FS load for system 300 is O(M) input file opens+O(R) output file opens, where M is the number of map tasks and R is the number of reduce tasks. Thus, the system 200 requires significantly more file system file open operations than the system 300.

Computer System for Large-Scale Data Processing

Figure 4:
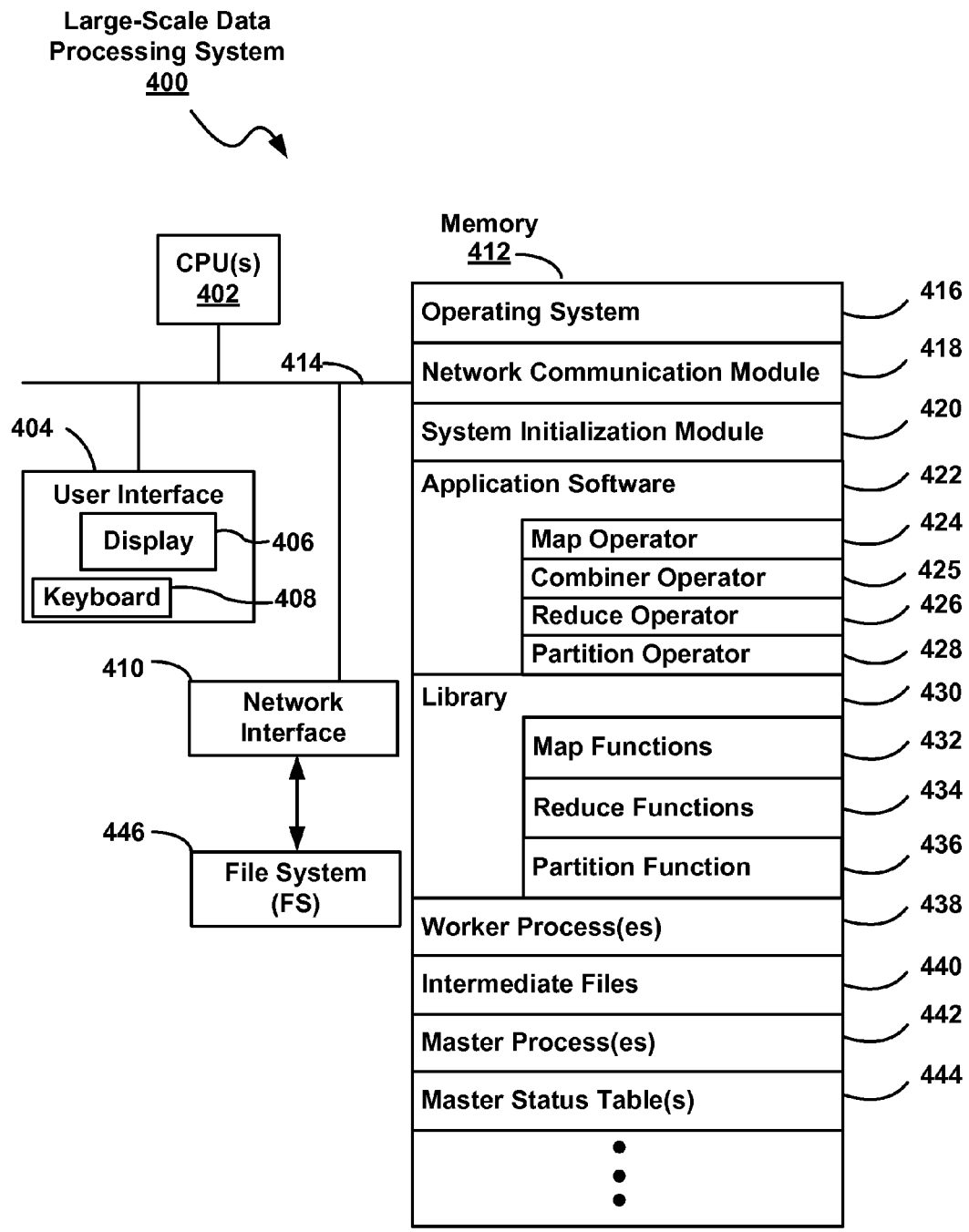
FIG. 4 is a block diagram of a computer system for the data processing systems shown in FIGS. 2 and 3.

FIG. 4 is a computer system 400 for the data processing systems 200 and 300 shown in FIGS. 2 and 3. The computer system 400 generally includes one or more processing units (CPUs) 402, one or more network or other communications interfaces 410, memory 412, and one or more communication buses 414 for interconnecting these components. The system 400 may optionally include a user interface 404, for instance a display 406 and a keyboard 408. Memory 412 may include high speed random access memory and may also include non-volatile memory, such as one or more magnetic disk storage devices. Memory 412 may include mass storage that is remotely located from the central processing unit(s) 402.

The memory 412 stores an operating system 416 (e.g., LINUX or UNIX), a network communication module 418, a system initialization module 420, application software 422 and a library 430. The operating system 416 generally includes procedures for handling various basic system services and for performing hardware dependent tasks. The network communication module 418 is used for connecting the system 400 to a file system (FS) 446, servers or other computing devices via one or more communication networks, such as the Internet, other wide area networks, local area networks, metropolitan area networks, and the like. The system initialization module 420 initializes other modules and data structures stored in memory 414 required for the appropriate operation of the system 400. In some embodiments, the application software 422 includes a map operator 424, a reduce operator 426 and a partition operator 428, and the library 430 includes application-independent map functions 432, reduce functions 434, and partition functions 436. As discussed above, the application software 422 may also include a combiner operator 425 when the map-reduce operation meets certain conditions. The functions, procedures or instructions in the library 430 handle the application independent aspects of large scaled data processing jobs, while the application software 422 provides the application-specific functions for producing output data. The application software 422 may include source programs for the map, combiner, reduce and partition operators as well as the corresponding compiled programs, represented by binary files 212 and 312 in FIGS. 2 and 3, respectively.

One or more status tables 444 are also included to track tasks and processes, as described with respect to FIGS. 7A and 7B. In some embodiments, the computer system 400 includes worker processes 438, intermediate files 440, and one or more master process(es) 442. The interaction of worker processes 438 and master processes 442 were described with respect to FIG. 3.

Referring to FIGS. 2, 3 and 4, an application programmer can create a script or program using the application software 422, which includes one or more operators 424, 426 and 428. The script or program is processed into binary files 212, 312 and provided to the work queue master 214, 314.

For the embodiment shown in FIG. 2, input files 202 are split into multiple data blocks and assigned by the work queue master 214 to individual, application independent map and reduce processes 204 and 208. The processes 204 invoke map functions 432 to process the input data (e.g., counting the number of occurrences of a term) to provide intermediate data values. In some embodiments, the input data is structured in the form of key-value pairs. The partition function 436 partitions the map output into one or more intermediate files 440, which are stored on the FS 446. The intermediate data values are processed by the map and reduce processes 204 and 208, which invoke reduce functions 208 for sorting and combining intermediate data values having the same key, and for storing the key and values in one or more output files 210 located on the FS 446. The work queue master 214 manages the map and reduce processes 204 and 208 with the assistance of status tables 444, as described with respect to FIGS. 7A and 7B.

For the embodiment shown in FIG. 3, input files 302 are split into multiple data blocks and assigned by the master process 442 to individual, application independent worker processes 438. The worker processes 438 invoke map functions 432 for operating on blocks of input data (e.g., counting the number of occurrences of a term) to provide intermediate data values. The partition function 436 partitions the map output into one or more intermediate files 440, which are stored locally in memory 412. The intermediate data values are processed by application independent worker processes 438, which invoke reduce functions 434 for sorting and combining intermediate data values having the same key, and for storing the resulting output data in one or more output files 310 located on the file system 446. The master process 442 manages the worker processes 436 with the assistance of status tables 444, as described with respect to FIGS. 7A and 7B.

Analyzing Data Records

Figure 8:
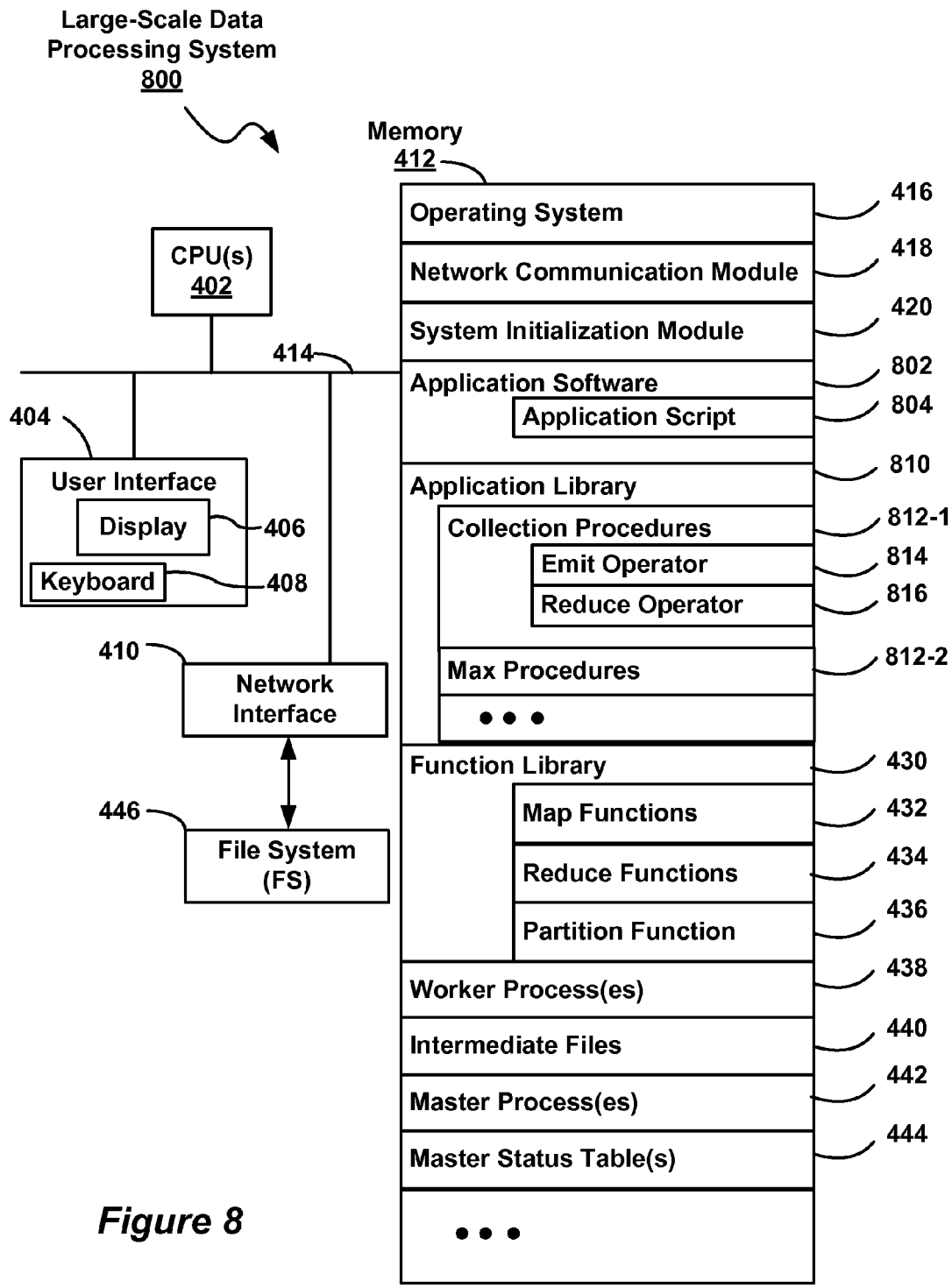
FIG. 8 is a block diagram of an exemplary system for analyzing data records.

FIG. 8 is a block diagram of an exemplary system for analyzing data records. Only the aspects of FIG. 8 that are different from FIG. 4 are described next. In particular, the application software 802 of system 800 includes an application script 804, which is executed during the map phase, and the system 800 also includes an Application Library 810. The application script 804 includes one or more table definitions, a query (also called a data extraction program or script), and one or more emit instructions (each of which invokes an emit operator). For convenience, the terms "application script" and "query" are sometimes used interchangeably in this document. The "query" being discussed here is used to extract data or values from a set of records, and is distinguished from a "search query" for identifying documents in a database or on the Internet that contain a specified set of query terms. The table definitions specify the type of statistical information to be accumulated when a set of records are processed by the application script 804. The query extracts zero or more items of information from each record, and the emit instructions cause information to be added to the tables. The emit instructions may be considered to be part of or embedded in the query.

The Application Library 810 is a set of application independent procedures 812. In one embodiment, each of the application library procedures includes at least an emit operator 814 and a reduce operator 816. The emit operator 814 for each statistical procedure includes instructions for evaluating data values provided to the emit operator and, when appropriate, updating the information stored in a corresponding table or other data structure (herein called a "table" for ease of explanation) for accumulating the statistical information corresponding to the statistical procedure. Some values provided to the emit operator may be discarded by the emit operator, after analysis of those values, because they provide no information required to be stored in the corresponding table. In some cases, the emit operator 814 may store information corresponding to, but not equal to, a value provided to the emit operator. For instance, an emit operator may increment a count value at a particular index in a table in response to a corresponding value being provided to the emit operator by the application script 804. Furthermore, this is an example of data aggregation that occurs during the map phase.

The reduce operator 816 for each application independent procedure 812 combines the intermediate data produced by multiple map tasks so as to produce a final set of results. The manner in which intermediate data is combined is specific to each type of procedure 812 and thus each application independent procedure 812 has an associated reduce operator. For example, for one application, values having matching index values are summed. In another application, the values for each index are inspected to identify unique index values, and a list of the unique index values is generated.

Figure 9:
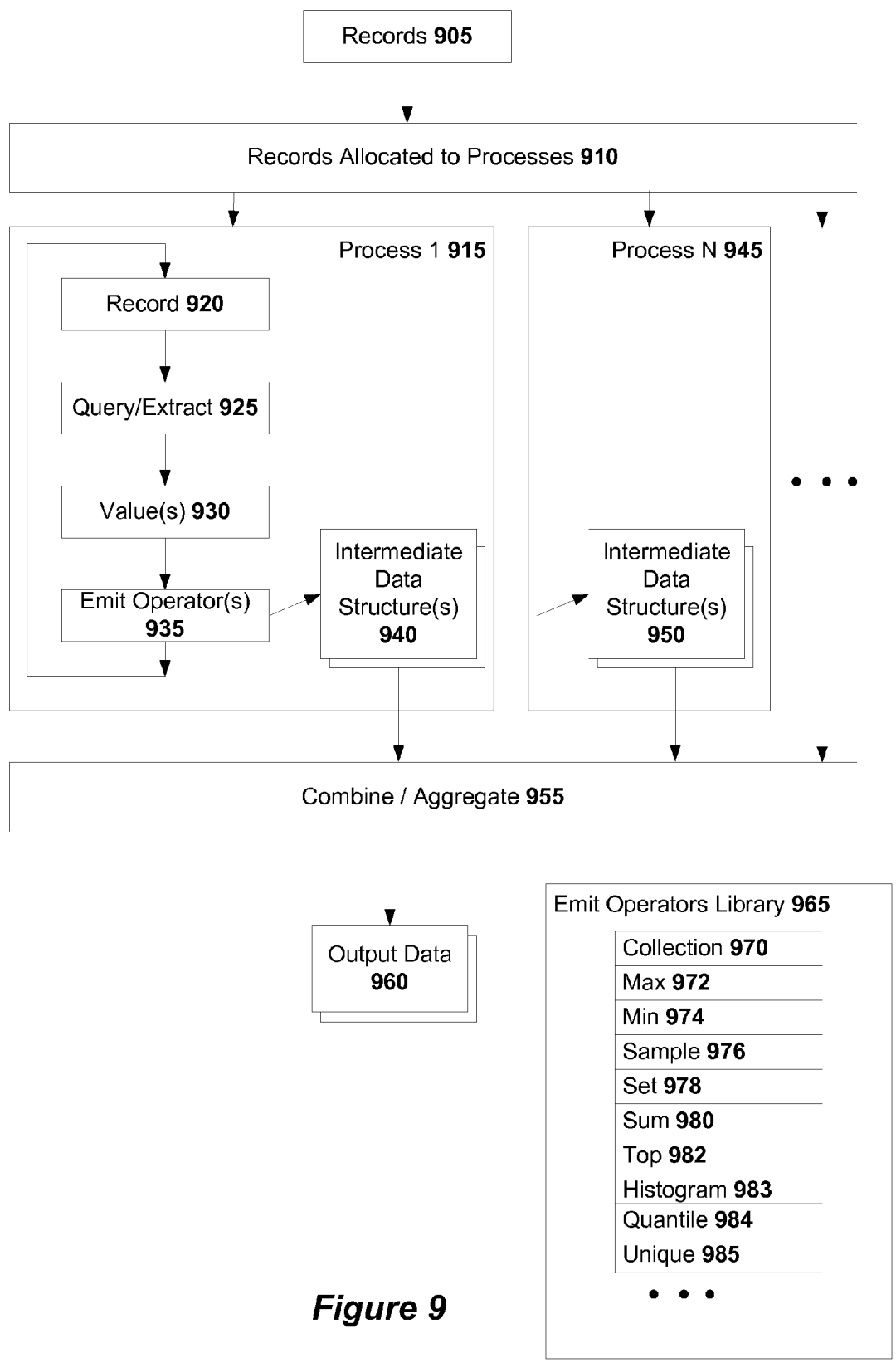
FIG. 9 is a flow diagram illustrating an exemplary method for analyzing data records.

FIG. 9 is a flow diagram illustrating an exemplary method for analyzing data records. At 910, groups of records 905 are allocated to a first plurality of processes, such as processes 915 and 945, which are processes operating in parallel. In some embodiments, the allocation is done in an application independent manner, for example by using process 600.

Records 905 can be, without limitation, log files, transaction records, documents, or virtually any other kind of data records. Records 905 can be in ASCII, binary, or any other file type. Records 905 can include both real-time data and off-line data.

In FIG. 9, the steps shown in process 1 (915) are exemplary of the steps that occur in each respective process 915 of the first plurality of processes for each record 920 in the group of records allocated to the respective process.

In some embodiments, if record 920 is unstructured, a parsed representation of record 920 is created prior to applying a query at 925. In some embodiments, the parsed representation of record 920 comprises one or more key-value pairs.

At 925, an application-dependent query is applied to record 920 (or to the parsed representation of record 920) to extract or produce zero or more values 930.

In some embodiments, query 925 is applied independently to each record 920 (or to the parsed representation of record 920). For such queries, the analysis of each record 920 is stateless, i.e., no state information needs to be passed from the processing of one record 920 to the next record. Thus, the values 930 produced by a query 925 that is applied independently to each record 920 depend on the content of the record 920 being queried, but do not depend on the contents of other records.

In some embodiments, query 925 is a procedural language query, i.e., a query written as an explicit sequence of steps to apply to record 920 to produce zero or more values. Table 1 provides a pseudo code example of an application script 804, which includes a query written in a procedural language. Although the word "query" is singular, it should be clear that one query 925 on record 920 can include multiple queries (sometimes called sub-queries) about the contents of record 920. Thus, multiple aspects of record 920 can be analyzed in one query 925.

TABLE 1

Pseudo Code Example of Application Script, Including Query

```
/* Define Tables */
Table1: table sum[query:string] of count:int
Table2: table top(100) of query:string weight millisec:int
Table3: table sum[language:string] of count:int
/* Apply the following query to each record */
When (record satisfies specified condition)
    {
    /* Extract information from one record */
    produce value1 from record;
    produce value2 from record;
    produce value3 from record;
    produce value4 from record;
    /* Emit information to tables */
    emit Table1[value1] <- 1;
    emit Table2[value2] <- value3 weight value4;
    emit Table2[value1] <- value3 weight value4;
    emit Table3[value3] <- 1;
    If (predefined condition regarding one or more of the produced
    values)
        {
        emit Table1[value4] <- 1;
        produce value5 from record;
```

TABLE 1-continued

Pseudo Code Example of Application Script, Including Query emit Table3[value5] <- value4;
}
} /* End of query */

The values 930 produced by the querying 925 of record 920 can take a variety of forms, including, without limitation, Boolean values, arrays of unsigned bytes, integers, floating point values, integral representations of time, hash values, compound structures, arrays, and strings (e.g., arrays of Unicode characters). The values 930 may be temporarily stored in local memory until processing of the current record is complete. In some embodiments, the values produced are represented by key-value pairs.

At 935, zero or more emit operators are applied to each of the zero or more produced values 930 so as to add corresponding information to one or more intermediate data structures 940.

In some embodiments, emit operator 935 is one of a set of predefined application-independent statistical information processing functions, such as one of the operators in emit operators library 965. Each of the emit operators can be thought of as a function that produces a table of values. Furthermore, each such table of values can be indexed using as few or as many indices as the user defines in the application-specific map operator. For each distinct value of the index, or each distinct set of index values (when the table has more than one index), the emit operator produces an associated set of values. For instance, if an emit operator is configured to produce the top 5 values of a set of values, and the table to which it stores data is configured (by the map operator) to be indexed by a single index, then the emit operator will produce the top 5 values for each distinct value of the index. If the table has two indexes (e.g., TopTable[index1][index2]), then the emit operator will produce the top five values for each distinct pair of index values.

Exemplary emit operators include, without limitation: Collection 970, a collection or concatenation of extracted values (sometimes herein called data values); Max 972, a sample of the N highest-weighted items or values per index; Min 974, a sample of the N lowest-weighted items or values; Sample 976, a statistical sampling of N values; Set 978, a set (unique elements) containing at most N items or values per index; Sum 980, an arithmetic sum of data values; Top 982, a statistical estimator for the 'most frequent N' items or values; Histogram 983, which determines the number of occurrences of each distinct value; Quantile 984, which sorts values and determines break points between N tiles (e.g., quartiles for N=4, percentiles for N=100) based on the distribution of the values; and Unique 985, a statistical estimator for the total number of unique items or values. These functions specify particular methods for aggregating the values 930 obtained from the data record queries (e.g., query 925).

In some embodiments, when applying query 925 to record 920 produces a plurality of values 930, each respective process 915 of the first plurality of processes includes applying a respective emit operator 935 to each (or at least a subset) of the produced values 930 so as to add corresponding information to a corresponding intermediate data structure of a plurality of intermediate data structures.

In some embodiments, each intermediate data structure 940 comprises a table having one or more indices. An index (sometimes called a key) can be, without limitation, a time, a number, or a string, thereby permitting the table to be indexed by time, numeric order, or alphabetical order. Indexing the tables by time permits answers to time-series questions (e.g., historical plots) to be easily generated.

In some embodiments, intermediate data structure 940 is a table having a plurality of indices, wherein at least some of the indices are dynamically generated in accordance with the produced values 930. In other words, the index values for which data is stored in the table are dynamically generated from the produced values. For example, if the table is defined to be indexed by an ASCII string, each value of which represents the name of a language, LangTable[language:string], then the values of the index will be determined dynamically based on the language names extracted from the records processed by the system. An example of a table having two indices is LangTable[language:string][day:int], where "day" represents the day of a week (1 to 7), month (1 to 31) or year (1 to 365). This table can be used to count queries for each distinct language on each day of a week, month or year. The index values for either or both of the two indices may be dynamically generated, or alternately could be statically generated when the table is initialized. There need not be any system imposed limit on the number of indices that can be defined for a particular table.

At 955, information from a plurality of intermediate data structures 940 is aggregated to produce output data 960. In some embodiments, the aggregating combines values 930 having the same index values. Each index value may be considered to be the key in a key-value pair. In some embodiments, output data 960 are a final set of tables.

In some embodiments, aggregation is performed by a plurality of second processes executing in parallel (e.g., process 208 or process 308). In some embodiments, in each respective process of the second plurality of processes, information is aggregated from a plurality of the intermediate data structures 940 to produce output data 960. The output data 960 may include multiple tables of aggregated output data, including one table for each table defined in the application script (804, FIG. 8).

In some embodiments, once output data 960 have been produced, a second query can be run on output data 960. If output data 960 are a set of records, these records can serve as the input records 905 for a second query using the process illustrated in FIG. 9. For example, a first query 925 followed by a first emit operator 935 could generate a collection 970 of phone calls from phone logs and produce output data 960 in the form of a table of records indexed by phone number. Each record contains information concerning phone calls to or from a distinct phone number. Consequently, a second query and emit operator(s) can be applied to each of these records according to the process shown in FIG. 9.

Examples of Data Record Analysis

The following pseudo code query (Table 2) analyzes web server logs ("WS logs") for the number of searches (sometimes herein called web searches) for images coming from Japanese language users. For these searches by Japanese language users, the query also determines the 100 most CPU-intensive searches.

TABLE 2

/* Input WS logs. Parse each log based on the description of such logs in */
/* WSLogEntryParse, which is defined in the file ""wslog.parse". */
parse "wslog.parse"
/* Declare and initialize the variable log__record. */

TABLE 2-continued

```
/* The type is WSLogEntryParse defined in "wslog.parse". */
/* The value, which is reinitialized for each input record, is generated by
implicit */
/* conversion (parsing) of the input record to that type. */
log_record: WSLogEntryParse = input;
/* Create a table to count the searches. */
japanimagesearch: table sum [search: string] of count: integer
/* Create an object for the 100 such searches that took the most total time
(aggregate) */
/* to serve. */
japanimagetoptime: table top(100) of search: string weight millisec:
integer;
/* Define some helper variables, which are reinitialized for each record. */
search: string = log_record.search;
request: string = log_record.request;
language: string = log_record.searchlang;
elapsedtime: integer =log_record.elapsedtime;
When (
   /* Look for log lines whose language field is Japanese and whose
   request is for the */
   /* image server. */
   match (" ja:", language) and match ("^ GET /images", request)
) {
   /* Count this record. */
   emit japanimagesearch[search] <- 1;
   /* Track how much time it took to serve. */
   emit japanimagetoptime <- search weight elapsedtime;
}
```

Each intermediate data structure 940 (e.g., a table) is used by one or more corresponding emit operators to gather and process values 930 emitted to it and store the results in indexed storage locations. Each emit operator (e.g., collection 970, max 972, etc.) knows how to aggregate the values 930 passed to it.

To show the usefulness of indices, the following example considers queries that count the number of web searches for various singers (e.g., Britney Spears, Madonna, etc.) A data structure 940 with no index, such as numbritneyqueries: table sum of integer;

can only count the number of web searches for one singer. On the other hand, adding indices to the tables permits more sophisticated queries. For example, the following data structure can be used to count the number of web searches for many different singers:

numdivaqueries: table sum [string] of integer;

This table is indexed by strings (e.g., the names of different singers, "britney," "madonna," etc.). Each entry in the table stores an integer (e.g., the number of web searches for the corresponding singer). For this data structure, an emit operator, such as emit numdivaqueries ["britney"]<-1 will aggregate the integer 1 to the table numdivaqueries indexed by the string "britney". Since the numdivaqueries table is configured to store sums, the effect of the emit operator example shown above is to add 1 to the count of "britney" web queries.

Each time an index value is used in an emit operation, the cell to store its value will be created if it does not already exist in the corresponding table.

Other exemplary types of data structures 940 (e.g., tables) for aggregating query values 930 include:

```
/* Collect all the web searches into a single stream. */
allsearches: table collection of string;
/*Count the number of times each web search is seen. */
numsearches: table sum [search: string] of count: integer;
/* Record the top 10 web searches for each country. */
topsearches: table top (10) [country: string] of search: string weight count:
integer;
/* Record the ten most remunerative web searches. */
bigmoney: table maximum (10) [search: string] of search: string weight
revenue: float;
/* Count how many unique web searches using an (internal) sampled
table of 10,000 */
/* entries to estimate the distribution. */
uniquesearches: table unique (10000) of search: string;
/* Gather up to ten distinct search strings for each distinct cookie */
session: table set (10) [cookie: string] of search: string;
```

The following pseudo code query (Table 3) illustrates the use of indices and aggregation to answer the question "How many web searches are made in each language?" for a given set of log records 905.

TABLE 3

```
/* Declare the table indexed by the name of the language to store the
results. */
searchesbylanguage: table sum[language:string] of count: integer;
/* For each record, parse the input record into the variable
'log_record'. */
log_record: LogRecord = input;
/* Discover the language of the search by doing some processing on the
search. */
/* here represented schematically by a call to the fictitious function
'language_of'. */
lang: string = language_of (log_record.search);
/* Create an event that records that there was a search in the logs that was
in this particular language.*/
emit searchesbylanguage[lang] <- 1;
```

As shown in Table 1 and Table 2 above, a more complex query would contain more aspects of a procedural language: 'if' statements, loops, local variables, etc. This query is deliberately simple for clarity.

This example (i.e., the query shown in Table 3) has a table (searchesbylanguage) indexed by the string representing the name of the language in the search. The system creates these indexed strings on demand. That is, the size of the table and the size of the strings to be used as indices do not need to be predeclared; the running of the query generates the appropriate indices and these table entries (for "english", "that", "japanese", etc.) are synthesized on demand.

In some embodiments, the events emitted by running the process on each record are collected on each processor where the process ran. Events collected on a given processor can be aggregated there for efficiency, to reduce the computation and bandwidth required to assemble the final table, e.g., output data 960. For instance, if our sample process runs on three processors, the counts can be accumulated on each processor, so after the query has been applied to all the records, there are in effect mini-tables on each processor, such as:

```
processor1:
    searchesbylanguage["chinese"] = 72041
    searchesbylanguage["english"] = 411520
    searchesbylanguage["russian"] = 123426
processor2:
    searchesbylanguage["chinese"] = 67129
    searchesbylanguage["english"] = 421526
    searchesbylanguage["russian"] = 170126
processor3:
    searchesbylanguage["chinese"] = 95397
    searchesbylanguage["english"] = 401521
    searchesbylanguage["russian"] = 52126
```

The final phase aggregates 955 these individual tables element by element to construct the final table 960, such as:

```
searchesbylanguage["chinese"] = 234567
searchesbylanguage["english"] = 1234567
searchesbylanguage["russian"] = 345678
```

In some embodiments, the final aggregation is done independently for each table, and furthermore final aggregation may be done independently for different indices (or groups of indices) of a table. For example, the final value for "english" can be determined on a separate process from the final value for "spanish."

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of processing a plurality of data records, performed on a system having one or more processors and memory storing one or more programs for execution by the one or more processors to perform the computer-implemented method, comprising:
   allocating subgroups of the plurality of data records to respective processes of a first plurality of processes;
   after the allocating, executing in parallel, in each respective process of the first plurality of processes, application-specific and application-independent operations comprising:
      for at least one data record in at least a subset of the subgroups of data records allocated to the respective process:
         extracting information from the at least one data record, by using one or more application-specific data processing operators provided by an application programmer;
         applying a multi-step script comprising a plurality of information processing commands applied sequentially to the extracted information to produce one or more values, wherein at least one step in the multi-step script includes selecting a respective application-independent emit operator on an application-specific basis and applying the respective application-independent emit operator to the information extracted from the at least one data record; and
         storing the one or more values in one or more intermediate data structures in a plurality of intermediate data structures; and
   in each process of a second plurality of processes, aggregating values from a subset of the plurality of intermediate data structures to produce output data.

2. The computer-implemented method of claim 1, wherein an intermediate data structure in the plurality of intermediate data structures is a table having a plurality of indices.

3. The computer-implemented method of claim 1, wherein a data record in the plurality of data records comprises a log file, a transaction record or a document.

4. The computer-implemented method of claim 1, wherein an intermediate data structure in the plurality of intermediate data structures is a table having a plurality of indices, wherein at least a subset of the plurality of indices is dynamically generated when one or more values are stored in the intermediate data structure.

5. The computer-implemented method of claim 1, wherein an intermediate data structure in the plurality of intermediate data structures is a table, the computer-implemented method further comprising initializing the table, wherein the table comprises a plurality of indices that are statically generated when the table is initialized.

6. The computer-implemented method of claim 1, wherein the processing function performs one or more of the following:
   (i) collects or concatenates the one or more values,
   (ii) analyzes the one or more values to obtain a predetermined number of highest-weighted items or values in the information for a predetermined key,
   (iii) analyzes the one or more values to produce a sample of a predetermined number of the lowest-weighted items or values in the information for a predetermined key,
   (iv) analyzes the one or more values to provide a statistical sampling of data for a predetermined key,
   (v) analyzes the one or more values to derive a set of unique elements containing at most a predetermined number of items or values in the information for a predetermined key,
   (vi) provides an arithmetic sum of the one or more values,
   (vii) analyzes the one or more values to obtain a statistical estimate of a predetermined number of most frequent items or values in the information for a predetermined key, and
   (viii) analyzes the one or more values to obtain a total number of unique items or values in the information for a predetermined key.

7. The computer-implemented method of claim 1, wherein a first process in the first plurality of processes generates a first intermediate data structure in the plurality of intermediate data structure, the first intermediate data structure having a first key,
a second process in the first plurality of processes generates a second intermediate data structure in the plurality of intermediate data structures, the second intermediate data structure having a second key, wherein the first key and the second key are the same, and
a process in the second plurality of processes aggregates (i) values from the first intermediate data structure indexed to the first key and (ii) values from the second intermediate data structure indexed to the second key to produce all or a portion of the output data.

8. The computer-implemented method of claim 1, wherein selecting a respective application-independent emit operator on an application-specific basis is performed by a user.

9. A system for processing data records, comprising:
   one or more processors; and
   memory storing one or more programs to be executed by the one or more processors;
   the one or more programs comprising instructions for:
      allocating subgroups of the plurality of data records to respective processes of a first plurality of processes;
      after the allocating, executing in parallel, in each respective process of the first plurality of processes, application-specific and application-independent operations comprising:
         for at least one data record in at least a subset of the subgroups of data records allocated to the respective process:
            extracting information from the at least one data record, by using one or more application-specific data processing operators provided by an application programmer;

applying a multi-step script comprising a plurality of information processing commands applied sequentially to the extracted information to produce one or more values, wherein at least one step in the multi-step script includes selecting a respective application-independent emit operator on an application-specific basis and applying the respective application-independent emit operator to the information extracted from the at least one data record; and storing the one or more values in one or more intermediate data structures in a plurality of intermediate data structures; and in each process of a second plurality of processes, aggregating values from a subset of the plurality of intermediate data structures to produce output data.

10. The system of claim 9, wherein an intermediate data structure in the plurality of intermediate data structures is a table having a plurality of indices.

11. The system of claim 9, wherein a data record in the plurality of data records comprises a log file, a transaction record or a document.

12. The system of claim 9, wherein an intermediate data structure in the plurality of intermediate data structures is a table having a plurality of indices, wherein at least a subset of the plurality of indices is dynamically generated when one or more values are stored in the intermediate data structure.

13. The system of claim 9, wherein an intermediate data structure in the plurality of intermediate data structures is a table, the instructions further comprising initializing the table, wherein the table comprises a plurality of indices that are statically generated when the table is initialized.

14. A non-transitory computer readable storage medium storing one or more programs configured for execution by a computer, the one or more programs comprising instructions for:

allocating subgroups of the plurality of data records to respective processes of a first plurality of processes;

after the allocating, executing in parallel, in each respective process of the first plurality of processes, application-specific and application-independent operations comprising:

for at least one data record in at least a subset of the subgroups of data records allocated to the respective process:

extracting information from the at least one data record, by using one or more application-specific data processing operators provided by an application programmer;

applying a multi-step script comprising a plurality of information processing commands applied sequentially to the extracted information to produce one or more values, wherein at least one step in the multi-step script includes selecting a respective application-independent emit operator on an application-specific basis and applying the respective application-independent emit operator to the information extracted from the at least one data record; and storing the one or more values in one or more intermediate data structures in a plurality of intermediate data structures; and in each process of a second plurality of processes, aggregating values from a subset of the plurality of intermediate data structures to produce output data.

15. The non-transitory computer readable storage medium of claim 14, wherein an intermediate data structure in the plurality of intermediate data structures is a table having a plurality of indices.

16. The non-transitory computer readable storage medium of claim 14, wherein a data record in the plurality of data records comprises a log file, a transaction record or a document.

17. The non-transitory computer readable storage medium of claim 14, wherein an intermediate data structure in the plurality of intermediate data structures is a table having a plurality of indices, wherein at least a subset of the plurality of indices is dynamically generated when one or more values are stored in the intermediate data structure.

18. The non-transitory computer readable storage medium of claim 14, wherein an intermediate data structure in the plurality of intermediate data structures is a table, the instructions further comprising initializing the table, wherein the table comprises a plurality of indices that are statically generated when the table is initialized.

* * * * *